US010075897B2

(12) United States Patent
Skillermark et al.

(10) Patent No.: US 10,075,897 B2
(45) Date of Patent: Sep. 11, 2018

(54) ACCESS BEACON TRANSMISSION AND RECEPTION SCHEMES

(71) Applicant: Telefonaktiebolaget LM Ericsson (publ), Stockholm (SE)

(72) Inventors: Per Skillermark, Årsta (SE); Bo Hagerman, Tyresö (SE); Karin Lagergren, Solna (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 218 days.

(21) Appl. No.: 15/189,980

(22) Filed: Jun. 22, 2016

(65) Prior Publication Data

US 2017/0223604 A1    Aug. 3, 2017

Related U.S. Application Data

(63) Continuation-in-part of application No. PCT/EP2016/051946, filed on Jan. 29, 2016.

(51) Int. Cl.
*H04W 40/24*  (2009.01)
*H04W 48/10*  (2009.01)
*H04W 72/04*  (2009.01)
*H04L 29/06*  (2006.01)
(Continued)

(52) U.S. Cl.
CPC ..... *H04W 40/244* (2013.01); *H04L 29/06027* (2013.01); *H04L 69/322* (2013.01);
(Continued)

(58) Field of Classification Search
CPC ....... H04W 4/00; H04W 48/10; H04W 72/04; H04W 48/12; H04W 4/008;
(Continued)

(56) References Cited

U.S. PATENT DOCUMENTS

2012/0026941 A1* 2/2012 Ahmad ................. H04W 48/16
                                                                              370/328
2013/0279381 A1* 10/2013 Sampath ............... H04W 48/08
                                                                              370/311
(Continued)

OTHER PUBLICATIONS

Bluetooth, "Specification of the Bluetooth® System—Core System Package [Low Energy Controller volume]", Specification vol. 6, Covered Core Package version: 4.2, Dec. 2, 2014, 194 pp.

(Continued)

*Primary Examiner* — Charles C Jiang
*Assistant Examiner* — Kyaw Z Soe
(74) *Attorney, Agent, or Firm* — Sage Patent Group

(57) ABSTRACT

An access beacon sequence is transmitted by an entity in a communication system, the access beacon sequence comprising at least one access beacon packet. A method includes segmenting the access beacon sequence into access beacon segments, by segmenting said at least one access beacon packet. For each one of the access beacon segments, an access beacon portion is generated to include a corresponding one of the plurality of access beacon segments and an indicator indicating that the access beacon portion refers to an access beacon sequence of the communication system, so as to obtain a plurality of access beacon portions corresponding to the plurality of access beacon segments. Each access beacon portion of the plurality of access beacon portions is transmitted on a respective frequency channel amongst a plurality of frequency channels, where different access beacon portions are sent on different frequency channels according to portion-frequency association information.

25 Claims, 12 Drawing Sheets

(51) Int. Cl.
- *H04W 28/02* (2009.01)
- *H04L 29/08* (2006.01)
- *H04W 48/12* (2009.01)
- *H04W 4/80* (2018.01)
- *H04W 74/00* (2009.01)

(52) U.S. Cl.
CPC ............. *H04W 4/80* (2018.02); *H04W 28/02* (2013.01); *H04W 48/10* (2013.01); *H04W 48/12* (2013.01); *H04W 72/0453* (2013.01); *H04W 74/002* (2013.01)

(58) Field of Classification Search
CPC ........... H04W 40/244; H04W 72/0453; H04W 28/02; H04L 69/322; H04L 29/06027
See application file for complete search history.

(56) References Cited

U.S. PATENT DOCUMENTS

| | | | | |
|---|---|---|---|---|
| 2015/0341853 A1* | 11/2015 | Cho | ................. | H04W 56/0015 370/331 |
| 2015/0365155 A1* | 12/2015 | Subramanian | ....... | H04B 7/0697 370/329 |
| 2016/0192301 A1* | 6/2016 | Sampath | ............... | H04W 48/08 370/338 |

OTHER PUBLICATIONS

ETSI, Harmonized European Standard—"Electromagnetic compatibility and Radio spectrum Matters (ERM); Wideband transmission systems; Data transmission equipment operating in the 2,4 GHz ISM band and using wide band modulation techniques; Harmonized EN covering the essential requirements of article 3.2 of the R&TTE Directive", ETSI EN 300 328 V1.9.1 (Feb. 2015) 91 pp.

FCC, Code of Federal Regulations, Title 47: Telecommunication—Chapter 1—Subchapter A—Part 15 (Radio Frequency Devices), downloaded Apr. 25, 2016 from http://www.ecfr.gov/cgi-bin/text-idx?SID=1687377b1928d81477797eca2d5284a8&mc=true&node=pt47.1.15&rgn=div5, 101 pp.

* cited by examiner

ACCESS BEACON TRANSMISSION AND RECEPTION SCHEMES

TECHNICAL FIELD

The present application relates in general to access beacon sequences, and more in particular to a method for transmitting an access beacon sequence, an entity for transmitting an access beacon sequence, methods for receiving an access beacon sequence, entities for receiving an access beacon sequence, and corresponding systems and computer programs.

TECHNICAL BACKGROUND

Bluetooth Low Energy (BLE) is, in its current form, a low-power, low-cost, and low-rate radio communication technique targeting, e.g., sensor applications and wearables. BLE operates in the unlicensed 2.4 GHz industrial, scientific, and medical (ISM) band. The ISM band, e.g. in the 2.4 GHz band, is practically available world-wide and the operation in the band is subject to local regulatory requirements. For example, the regulatory rules are determined by the FCC and ETSI in the US and Europe, respectively. BLE communication takes place over two different types of channels, namely the access beacon channels and the data channels; there are three access beacon channels and 37 data channels available. The access beacon channels are used, e.g., for broadcasting of information and/or for connection setup whereas the data channels are used for communication between two connected devices. There are two ways to communicate in systems like BLE. The first way relies on access beacon messages or events: one device sends (control and/or data) information to one or more other devices; the one or more other devices can act on this information (e.g. by processing the received information, by reacting with an access beacon event of its own, etc.) or request to connect to the device transmitting the access beacon. The second way of communication is based on connections or connection events, wherein two connected devices can exchange packets. It can be said that access beacon messages or events are unidirectional, while communication based on connections or connection events are bidirectional. It can be further said that for an access beacon to be carried out, no connection needs to be in place, such that an access beacon event can also be regarded as a type of random access messages towards one or more other devices, without however the obligation by the other device(s) to respond to such access beacon message even when that message has been correctly received or processed. As to the difference between transmitting the access beacon and connection events, reference is also made to the Bluetooth specification, see e.g. Covered Core Package version 4.2, Volume 1, part A, 1.2 or volume 2 thereof.

Slow frequency hopping is used for both the access beacon channels and the data channels. On the access beacon channels all transmissions are typically repeated three times; once per access beacon channel. The channel used for data communication is changed at regular intervals, each connection interval, but two communicating devices typically have time to exchange several packets on the same channel before it is time to change to a new channel.

FIG. 1 shows a schematic overview of the legacy physical (PHY) layer packet processing for transmitting the access beacon. The link layer (LL) PDU is delivered down from the link layer to the physical layer and is there referred to as the PHY layer SDU. To this SDU a CRC, calculated over the PHY SDU (LL PDU), is added and an access address (AA) and a preamble are appended in front. In legacy BLE all transmissions over the access beacon channels use a fixed, pre-defined access address and a fixed, pre-defined preamble. The PHY SDU (which will also be referred to as an access beacon packet) is transmitted over the air using one access beacon channel amongst those channels available as access beacon channels. Thus, it may be sufficient for a receiver to receive the access beacon packet on a single frequency. Access beacon events are described in detail in the Bluetooth specification version 4.2, see e.g. the above mentioned standard in particular Vol. 6, part B, 4.4.2.

To make BLE technology applicable to a wider range of use cases one may envision several possible improvements to the technology. One constraint for such updates is that the technology also after the update should comply with the regulatory requirements in the ISM band. Another requirement, which is voluntary in nature but still desirable, is that the update considers backwards compatibility; loosely speaking this implies that it should allow for the co-existence of both legacy and new devices in the same network without compromising the performance. Similarly, if a device supporting the new set of features attempts to access a legacy network, this should not compromise the performance of the legacy network.

One possible technology development is the introduction of higher rates. Such a change would make BLE a candidate for services that require higher data rates compared to what is currently supported. A further possible development relates to improving the capacity of such communication systems, e.g. increasing the number of devices that can be concurrently be present in a communication system, without impairing communication, or by reducing the level of impairment that can be caused on other devices. Another possible development is communication over longer range. Longer range may be realized, e.g., by improving the sensitivity, or increasing the maximum allowed output power. In the following, focus will be on the challenges underlying a desired increase of range, and in particular on an increase in the maximum allowed output power as a way to achieve such longer range. Conceptually, it is relatively easy to increase the output power, in the sense that it suffices to introduce a radio section capable of sending more power (i.e. a stronger signal) into the air, for instance from the present 10 dBm (10 mW) to an increased maximum allowed power of up to e.g. 20 dBm (100 mW) or e.g. 30 dBM (1 W) (when noting that similar considerations would apply also to other values higher than the current 10 dBm limit). However, one of the problems lies in dealing with the communication impairment (like interferences, collisions, etc.) that a higher power level may cause to other devices operating in the ISM/2.4 GHz band. It can thus be said that, in general, it is desirable to improve existing systems by reducing the level of impairment caused on other devices.

It is therefore desirable to provide improved method(s), entities, computer programs and system, which overcome, or at least mitigate, the above-mentioned problems when wanting to improve communication systems like present BLE.

SUMMARY OF THE PRESENT INVENTION

The object is achieved by the subject-matter of the independent claims. Advantageous embodiments are defined in the dependent claims. Further examples are provided for facilitating the understanding of the invention.

According to a first aspect, it is provided a method for transmitting an access beacon sequence by one entity capable of communicating in a communication system. The method comprises:

- segmenting the access beacon sequence in a plurality of access beacon segments, wherein segmenting the access beacon sequence comprises segmenting said at least one access beacon packet;
- for each one of said plurality of access beacon segments, generating an access beacon portion comprising a corresponding one of said plurality of access beacon segments and an indicator indicating that the access beacon portion refers to an access beacon sequence of the communication system, so as to obtain a plurality of access beacon portions corresponding to the plurality of access beacon segments;
- transmitting each access beacon portion of the plurality of access beacon portions on a respective frequency channel amongst a plurality of frequency channels, wherein different access beacon portions are sent on different frequency channels according to portion-frequency association information.

According to a second aspect, it is provided an entity for transmitting an access beacon sequence, the entity capable of communicating in a communication system, said access beacon sequence comprising at least one access beacon packet. The entity comprises:

- segmenting means for segmenting the access beacon sequence in a plurality of access beacon segments, wherein segmenting the access beacon sequence comprises segmenting said at least one access beacon packet;
- generating means for generating, for each one of said plurality of access beacon segments, an access beacon portion comprising a corresponding one of said plurality of access beacon segments and an indicator indicating that the access beacon portion refers to an access beacon sequence of the communication system, so as to obtain a plurality of access beacon portions corresponding to the plurality of access beacon segments;
- transmitting means for transmitting each access beacon portion of the plurality of access beacon portions on a respective frequency channel amongst a plurality of frequency channels, wherein different access beacon portions are sent on different frequency channels according to portion-frequency association information.

According to a third aspect, it is provided a method for receiving an access beacon sequence at one entity capable of communicating in a communication system, said access beacon sequence comprising at least one access beacon packet. This method comprises:

- receiving a plurality of access beacon portions, each access beacon portion of the plurality of access beacon portions being present on a respective frequency channel amongst a plurality of frequency channels, wherein different access beacon portions are received on different frequency channels according to portion-frequency association information, and wherein each access beacon portion comprises an access beacon segment and an indicator indicating that the access beacon portion refers to an access beacon sequence of the communication system, further wherein segments received in correspondence of the plurality of received portions comprise segments of said at least one access beacon packet comprised in the access beacon sequence;
- assembling the plurality of access beacon segments received in correspondence of the plurality of access beacon portions so as to obtain the access beacon sequence comprising the at least one access beacon packet.

According to a fourth aspect, it is provided an entity for receiving an access beacon sequence, the entity capable of communicating in a communication system, said access beacon sequence comprising at least one access beacon packet. This entity comprises:

- receiving means for receiving a plurality of access beacon portions, each access beacon portion of the plurality of access beacon portions being present on a respective frequency channel amongst a plurality of frequency channels, wherein different access beacon portions are received on different frequency channels according to portion-frequency association information, and wherein each access beacon portion comprises an access beacon segment and an indicator indicating that the access beacon portion refers to an access beacon sequence of the communication system, further wherein segments received in correspondence of the plurality of received portions are segments of said at least one access beacon packet comprised in the access beacon sequence;
- assembling means for assembling the plurality of access beacon segments received in correspondence of the plurality of access beacon portions so as to obtain the access beacon sequence comprising the at least one access beacon packet.

According to a fifth aspect, it is provided a method for receiving an access beacon sequence at one entity capable of communicating in a first communication system and in a second communication system, said access beacon sequence comprising at least one access beacon packet. This method comprises:

- receiving a first access beacon portion on a frequency channel, the first access beacon portion comprising an access beacon segment and an indicator indicating whether the access beacon portion refers to an access beacon sequence of the first communication system or of the second communication system;
- determining, on the basis of the received indicator, a system identifier identifying which one amongst the first communication system and second communication system the access beacon portion refers to;

when said system identifier identifies the first communication system:

- receiving further access beacon portions on respective frequency channels according to access beacon portion-frequency association information, wherein segments received in correspondence of the received portions are segments of said at least one access beacon packet comprised in the access beacon sequence, and
- assembling the plurality of access beacon segments received in correspondence of the plurality of access beacon portions so as to obtain the access beacon sequence comprising the at least one access beacon packet; and when said system identifier identifies the second communication system, obtaining the access beacon sequence comprising the at least one access beacon packet on the basis of the first received portion.

According to a sixth aspect, it is provided an entity for receiving an access beacon sequence, the entity capable of communicating in a first communication system and in a second communication system, said access beacon sequence comprising at least one access beacon packet. This entity comprises:

receiving means for receiving a first access beacon portion on a frequency channel, the access beacon portion comprising an access beacon segment and an indicator indicating whether the access beacon portion refers to an access beacon sequence of the first communication system or of the second communication system; wherein the receiving means are configured to receive further access beacon portions on respective frequency channels according to portion-frequency association information, when said indicator indicates that the access beacon portion refers to an access beacon sequence of the first communication system, wherein access beacon segments received in correspondence of the received portions are segments of said at least one access beacon packet comprised in the access beacon sequence; the entity further comprising sequence access beacon obtaining means (64) configured to:

assemble the access beacon segments received in correspondence of the plurality of access beacon portions so as to obtain the access beacon sequence comprising the at least one access beacon packet, when said indicator indicates that the access beacon portion refers to an access beacon sequence of the first communication system, and obtain the access beacon sequence comprising the at least one access beacon packet on the basis of the first received portion, when said system identifier identifies the second communication system.

According to a seventh aspect, it is provided a computer program for transmitting an access beacon sequence, the computer program configured to execute, when said computer program is executed on a computer, all the steps according to any of the methods according to one of the above aspects.

According to a further aspect, it is provided a system comprising at least one entity according to the above second aspect and at least one entity according to any of the above fourth and sixth aspect.

Moreover, the above second, fourth and sixth aspects have been described in terms of segmenting means, generating means, transmitting means, receiving means, assembling means, obtaining means. However, those entities can also be described as apparatuses comprising corresponding units like segmenting unit (or segmentor), generating unit (generator), transmitting unit (transmitter), receiving unit (receiver), assembling unit (assembler), obtaining unit (obtainer), wherein the apparatuses comprises one or more processors and one or more memories, configured to implement said units.

DETAILED DESCRIPTION

The present invention will now be described in conjunction with specific embodiments by making reference to the drawings. It is however noted that these specific embodiments as well as the illustrative figures serve to provide the skilled person with a better understanding of the invention but are not intended to restrict in any way the scope of the invention which is defined by the independent claims.

In the present disclosure the phrase "access beacon" is equivalent to and interchangeable with the term "advertisement." For example, operations performed by electronic devices that communicate using the Bluetooth protocol or, more particularly, the Bluetooth Low Energy protocol, may be more appropriately described with the term "advertisement" instead of "access beacon." Accordingly, each instance of the phrase "access beacon message" can be replaced with the phrase "advertisement message"; each instance of the phrase "access beacon event" can be replaced with the phrase "advertisement event"; each instance of the phrase "access beacon channel" can be replaced with the phrase "advertisement channel"; and each instance of the phrase "access beacon packet" can be replaced with the phrase "advertisement packet."

Figure 2:
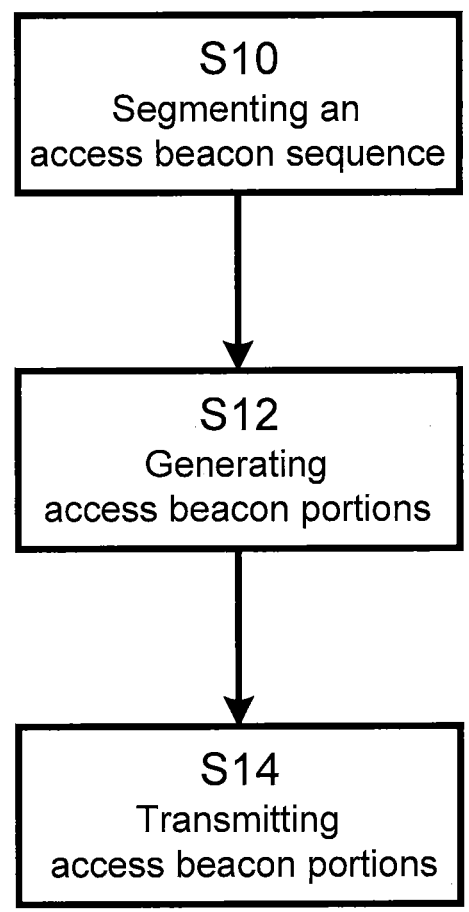
FIG. 2 shows a flowchart illustrating a method for transmitting an access beacon sequence according to a first embodiment of the invention.

With reference to FIG. 2, description is made of a first embodiment of the invention directed to a method for transmitting an access beacon sequence comprising at least one access beacon packet. The access beacon packet is a packet comprising information necessary for performing access beacon communication as known in the art and as explained in the above background section, to which reference is made. In particular, the information can comprise control and/or data that can be broadcast or sent to a single device, without the need for a connection to be in place, in order to inform the same of any control and/or data information comprised in the access beacon packet. The receiver can listen or (re)act, for instance by requesting a connection and/or responding with another access beacon packet.

The access beacon sequence is sent from one entity capable of transmitting signals in a communication system.

The method comprises a step S10 of segmenting the access beacon sequence in a plurality of access beacon segments; since the sequence comprises at least one access beacon packet, segmenting the access beacon sequence comprises segmenting the at least one access beacon packet. As also discussed later, the sequence can also comprise of a plurality of access beacon packets, in which case the segmentation is preferably made for all access beacon packets. An example of the access beacon packet is the PHY SDU later discussed, though for the purpose of the present invention the access beacon packet can be considered also to be exemplified by the LL PDU: in fact, both PHY SDU and LL PDU contain the information (though at different layers) for access beacon purposes.

In step S12, access beacon portions are generated. An access beacon portion (also portion in short) comprises one access beacon segment and an indicator indicating that the access beacon portion refers to an access beacon sequence of the communication system. Thus, the indicator enables a potential receiver to determine that the access beacon sequence, and thus the access beacon packet therein included, refers to a specific system, e.g. a first system different from a second system. Optionally, the first system comprises or is a system having higher power than the legacy BLE. In this non-limiting example, receivers enabled to perform communication in the first system, e.g. in a high power BLE, can and generally will handle the access beacon packet as foreseen by the first communication system, since these receivers can recognize the high power access beacon packet from the indicator. Legacy receivers may instead discard the portion and possibly the entire sequence, since they will not be able to process the indicator. In general, what matters is that the indicator indicates whether the portion refers to the communication system within which the entity is capable to communicate; such a system can be distinguished from a second communication system, regardless of the maximum allowed power.

In general, for each segment a portion will be generated so as to obtain a plurality of portions corresponding to (i.e. in the same number as) the plurality of segments and each portion comprising the indicator. However, it is not strictly necessary that all portions include the indicator. In fact, it may suffice that only one or a subset of the overall portions include the indicator. The portion with the indicator may preferably be the first to be sent in the sequence, but could equally be placed at the end or somewhere within the sequence to be sent. In case of a subset of portions comprising the indicator, these could be distributed (preferably but not necessarily uniformly or evenly) within the sequence to be transmitted, e.g. one portion every 2, or 3, or 4, etc. portions (or according to a pattern) include an indicator. The other portions will correspond to the corresponding segment without an indicator included. A non-limiting example of the indicator is the Access Address (AA) later discussed.

In step S14, the generated access beacon portions are transmitted each on a respective frequency channel selected amongst a plurality of frequency channels, wherein different access beacon portions are transmitted on different frequency channels according to portion-frequency association information (also association information in short). The association information represents information that associate, or (in other words) put in a one-to-one correspondence, each portion with a frequency channel on which the portion is to be sent. The association information can be known a priori to all (or at least a part of all) devices included in the first communication system: in such a way, the receiver having knowledge of such association information will be able to correctly receive all portions on the corresponding frequency channels, since the sender will have placed the same on the respective frequencies on the base of the same association information. In case the association is not known to the receiver(s), a field can be introduced into the packet (or at least into one of the portions, preferably the first) to indicate which association between portions and frequencies has been followed, or to refer to one (possibly amongst a plurality of) association information pre-stored or accessible to the receiver and sender. In an optional alternative, the association information can be included in a separate channel (e.g. a broadcast channel) or statically configured by another channel. Example of association information include: a correspondence table between portions and frequencies, a bitmap to the same effect, a deterministic rule for determining a portion number from a frequency number or vice versa, etc. In general, it is preferable that all portions are transmitted on all (but not necessarily) different frequency channels. However, it may be the case (especially, but not only, if the number of portions is larger than the number of available frequencies) that some portions are sent on the same frequency channel: it suffices however to have different portions sent on different frequency channels amongst the plurality of available channels. In fact, as long as different portions are sent on different channels, the transmission will be such that still the access beacon packet is segmented, corresponding portions generated, and at least a plurality of (not necessarily all) portions of the packet sent on different channels. As also later explained in more detail, this will allow improving communication, e.g. by dispersing the interferences and/or collisions thus avoiding the impairment caused on other devices even when the access beacon is sent at a high power. It is noted that the transmission at step S14 can refer to a transmission of portions in a time sequence, e.g. each portion is sent at a time with a time distance (also possibly zero) between two consecutive portions. This is however not strictly necessary, as the transmission of all (or part of) portions can be made at the same time, as long as the portions to be transmitted at the same time are on different frequency channels.

The access beacon sequence can be a sequence for performing unidirectional communication from the sending entity towards one or more other entities comprised in the first communication system. As above illustrated, unidirectional refers to the fact that no connection is (or needs to be) present for an access beacon packet to be sent. The receiver may simply make use of the control and/or data information contained in the access beacon, e.g. when the access beacon comprises a temperature measurement sent from a sensor to a device collecting such information. In case the receiver wants to respond, since there is no connection in place, it needs to either establish a connection and/or respond with another access beacon message (in the sense of a sequence comprising an access beacon packet). An access beacon sequence can refer for instance to a broadcast or multicast message, or can be directed to a specific device.

Optionally, the communication system in which the above entity is capable to communicate may be a first communication system. The first system may be such that entities present therein are allowed to transmit up to a first maximum allowable power. In particular, the first maximum allowable power is larger than a second maximum transmission power allowed in a second communication system. In other words, the first communication system is characterized by having a high (or higher) maximum allowable power when compared to the second communication system. Legacy BLE as currently standardized represents an example of the second communication system, while an example of the first communication system is represented by a BLE system wherein devices are allowed to transmit at a higher power than in legacy BTE.

Optionally, the access beacon sequence may comprise a plurality of access beacon packets. Preferably, all access beacon packets are segmented, though it suffices that only one of the plurality of packets is segmented as described with reference to FIG. 2. In case a plurality or all packets are segmented, then the method illustrated in FIG. 2 applies, in that the packets included in the sequence are segments to obtain corresponding portions to be sent on different frequencies as explained above. Further optionally, the plurality of packets can comprise copies of the same access beacon packet. In one illustrative example, the sequence comprises three access beacon packets, each having the same information content, for instance three copies of the PHY SDU packet later described.

Figure 1:
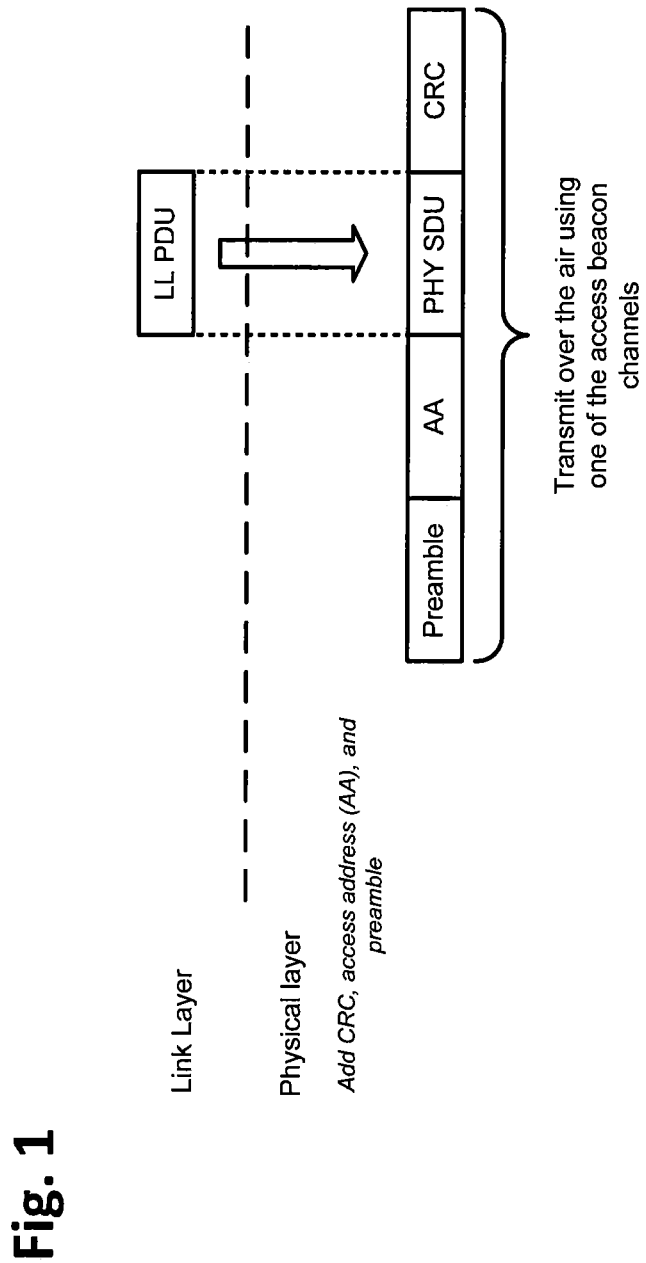
FIG. 1 is a schematic diagram showing physical packet processing at the transmitter side, according to conventional legacy BLE.

It is noted that, if present, an entity capable of communicating in the second communication system sends an access beacon portion comprising the entire access beacon packet on a single frequency channel. In other words, an entity of the second communication system does not segment a single packet, but sends its entire content on one frequency channel. In case a plurality of packets is present, each of them may be sent on different frequency channels, however each single packet is not portioned or segmented. An example of such entity in the second communication system is a device according to legacy BLE, sending an access beacon packet as illustrated for instance in FIG. 1.

Optionally, the frequency channels used for the access beacon portions are at least partially in common with frequency channels used for bi-directional communication. In fact, the first communication system can be designed as having a first set of frequency channels for sending access beacon portions, and a second set of frequency channels for sending any of the access beacon portions and/or communication messages (regardless of whether and how these are segmented). For instance, at least one portion may be sent on one channel of the first set, while other portions may be sent on the second set. Preferably, the first portion is sent on a set of frequency channels used only for access beacon (e.g. for sending only access beacon portions), so that receivers can listen only to the access beacon channel, thus saving energy. Preferably the first portion is sent on one of the three legacy BLE access beacon channels. Then, once an access beacon portion is correctly detected on the first set of channels, receivers can receive on as many channels as needed according to the association information.

Optional alternatives to the above distinction of first and second set of channels are equally suitable: the first set is for access beacon only, and the second set is only for bi-directional communication (i.e. for communication where a connection is established, or for connection events). The partition between first and second set is also not strictly necessary: in fact, in an alternative, all available frequency channels can be shared for both types of communication, i.e. for access beacon events and for communication events.

Optionally, the indicator above introduced when illustrating FIG. 2 may comprise a first indicator sequence, i.e. a sequence or succession of bits or symbols having certain characteristics, wherein the first indicator sequence has low cross-correlation with a second indicator sequence used to indicate access beacon portions referring to access beacon sequences used in the second communication system which is different from the first communication system. As known in the art, any type of sequence can be used as long as it is capable of achieving low correlation with another sequence. Examples of such sequences include PN sequences, orthogonal or quasi-orthogonal codes, etc. By using a first sequence having the above property, a receiver of the first system can thus recognize that the access beacon refers to the type used in the second communication system (being different from the first communication system, regardless of the type of difference). A receiver not capable of communication in the first communication system, may instead not detect such indicator at all (it may also be sensed like noise). In an illustrative example, a device capable of high power BLE will detect the portion and further receive the access beacon sequence and packet according to the access beacon mechanism used in the high power BLE (i.e. on the basis of the association information). A legacy receiver, i.e. capable of receiving only legacy BLE access beacon, will not detect or recognize the portion, possibly neglect it, such that backward compatibility is also maintained in the sense that introduction of the new access beacon scheme does not prejudice the usual functioning of legacy devices. The use of a sequence is however not strictly necessary, as in fact the indicator may also be represented by a number (one or more bits) and/or string indicating whether the portion related to the first (or optionally the second or other) communication system.

Optionally, additional information can be added to the access beacon packet (e.g. by way of appending to the packet, inserting in the middle, attached at the end, or any combination thereof). This information can comprise an error detection code, like CRC or any other code suitable to detect errors. The error detection code is preferably calculated on the basis of the payload of the access beacon message. For instance, the CRC can be determined on the basis of the PHY SDU later discussed. Further, the additional information may comprise an association information field for indicating the association information. The association information field may include the one-to-one correspondence between portions and frequencies (by way of a table, mapping, etc.) or may refer to an identifier identifying an association information pre-stored within or accessible (e.g. retrievable from another device) by the entities. The pre-stored refers to a pre-storage made once, e.g. upon production and/or configuration, but also to the possibility of changing pre-stored association by replacing some and/or adding new association information.

In the following, other embodiments and examples will be presented. It is noted that the terminology as well as all considerations (including all optionally described features) made above with respect to the first embodiment equally apply to the following, unless otherwise specified, and which will therefore not be repeated. Also, the above considerations and terminology apply to the inter-related receiving entities and methods, as the skilled person immediately recognizes.

Figure 3:
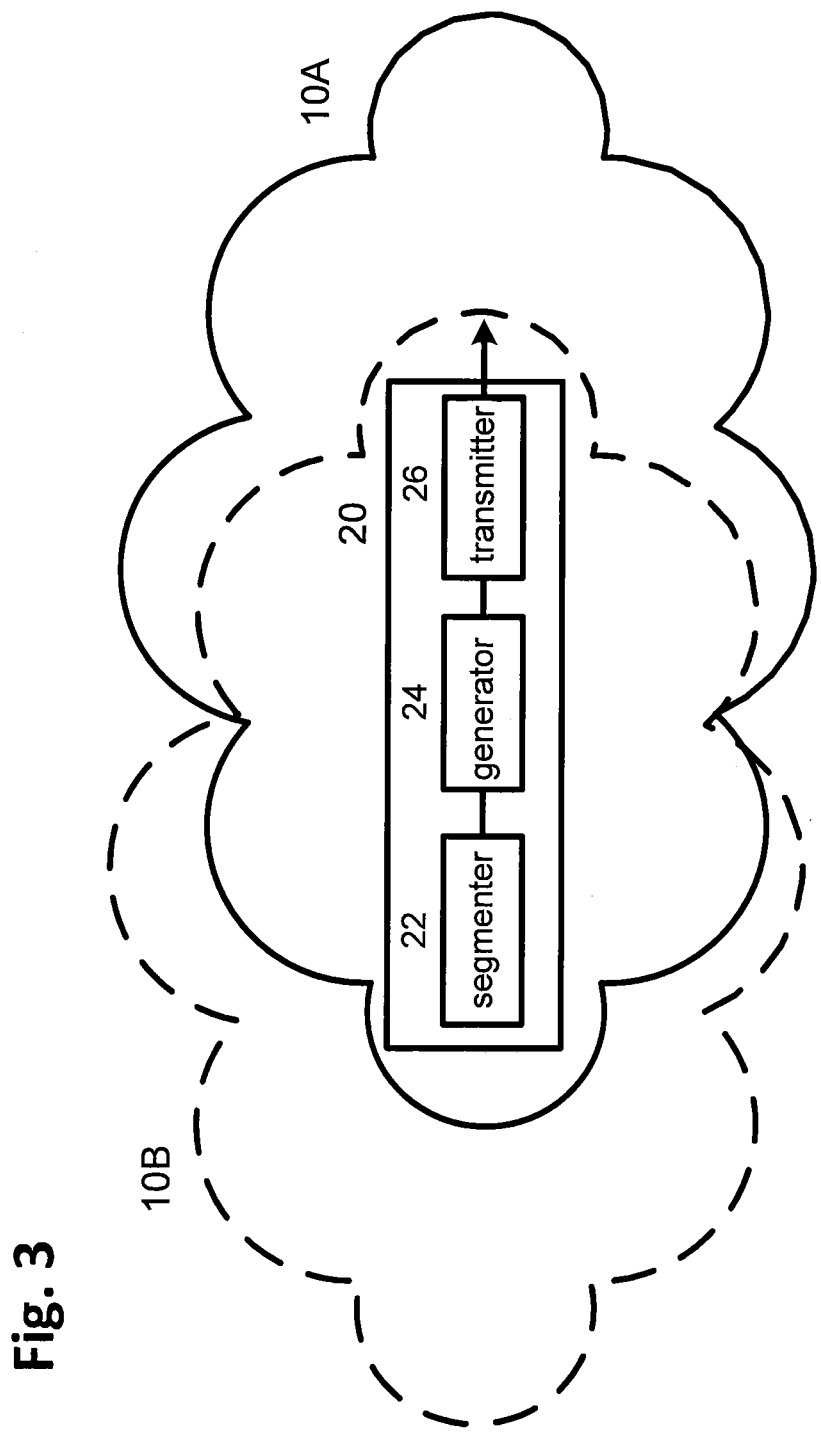
FIG. 3 shows a block diagram illustrating an entity for transmitting an access beacon sequence according to a second embodiment of the invention.

A second embodiment will now be described with reference to FIG. 3, showing an entity (20) for transmitting an access beacon sequence. The entity (20) is capable of transmitting in a communication system. The entity (20) comprises segmenting means (or segmenter, 22), generating means (or generator, 24) and transmitting means (or transmitter, 26). The segmenting means (22) is configured to segment the access beacon sequence in a plurality of access beacon segments. The generating means (24) is configured to generate, for each one of the plurality of access beacon segments, an access beacon portion comprising a corresponding one of the plurality of access beacon segments and an indicator indicating that the access beacon portion refers to an access beacon sequence and/or access beacon packet of the communication system (10A). In this way, a plurality of access beacon portions is obtained in correspondence of (or in the same number of) the plurality of access beacon segments. It is noted that since the access beacon sequence includes an access beacon packet, and since the segmenting means are configured to segment the access beacon packet included in the access beacon sequence, it follows that the access beacon packet is also segmented and transmitted within the portions.

The transmitting means (26) is configured to transmit each access beacon portion of the plurality of access beacon portions on a respective frequency channel comprising a plurality of frequency channels, wherein different access beacon portions are sent on different frequency channels according to portion-frequency association information.

The entity (20) is further optionally configured to perform all steps, also those above indicated as optional or as variant, of the first embodiment. In particular, the entity (20) comprises necessary additional means for performing those additional steps, or the means indicated in FIG. 3 are correspondingly additionally configured as evident to the skilled person.

It is noted that the entity (20) may also be optionally capable of communicating within or according to a further communication system (10B) being different from the communication system 10A.

Also, optionally, the difference between the first and second communication systems may lie in the maximum power allowed under the respective system. For instance, the first communication system may be such that a first maximum power is allowed therein, wherein the first maximum transmission power is larger than a second maximum transmission power allowed in a second communication system (10B). However, the difference may also lies in other characteristics, for instance the fact that in the first system the described segmenting is applied, while in the second system no segmenting is applied or a different type of segmenting.

As anticipated, considerations made above with respect to the sending methods and entities are correspondingly applicable to the inter-related receiving methods and entities. In the following, thus, embodiments and examples relating to the receiving side will be described, while omitting for brevity other details that the skilled person would immediately derive from the above (including all optionally described features or variants).

Figure 4:
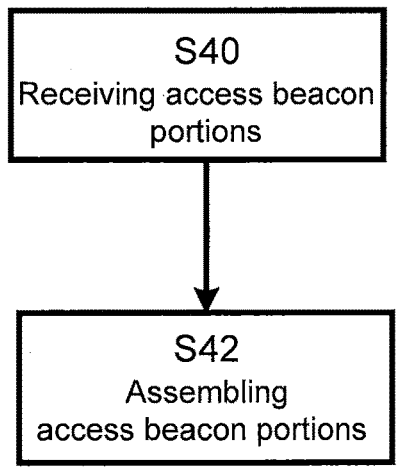
FIG. 4 shows a flowchart illustrating a method for receiving an access beacon sequence according to a third embodiment of the invention.

A third embodiment will now be described with reference to the flow chart of FIG. 4 illustrating a method for receiving an access beacon sequence at one entity capable of communicating in the communication system, wherein the access beacon sequence comprises at least one access beacon packet. Optionally, entities of the first communication system are allowed to transmit up to a first maximum power, wherein the first maximum transmission power is larger than a second maximum transmission power allowed in the second communication system.

In step S40, a plurality of access beacon portions are received, wherein each of the access beacon portions of the plurality of portions is present on a respective frequency channel amongst the plurality of frequency channels. Further, different access beacon portions are received on different frequency channels according to portion-frequency association information. Still further, each access beacon portion comprises an access beacon segment and an indicator indicating that the access beacon portion refers to an access beacon sequence of the first communication system. In step S42, the plurality of access beacon segments received in correspondence of the plurality access beacon portions are assembled so as to obtain the access beacon sequence. It is noted that receiving the plurality of portions implies receiving a plurality of access beacon segments. When noting that the plurality of segments have been obtained by segmenting the access beacon sequence and in particular the access beacon packet comprised in the access beacon sequence, it follows that receiving the plurality of portions implies that parts of the access beacon message are received in correspondence of the plurality of portions. Thus, by assembling the plurality of portions received, it is possible to assemble the access beacon packet and the access beacon sequence comprising the access beacon packet.

Figure 5:
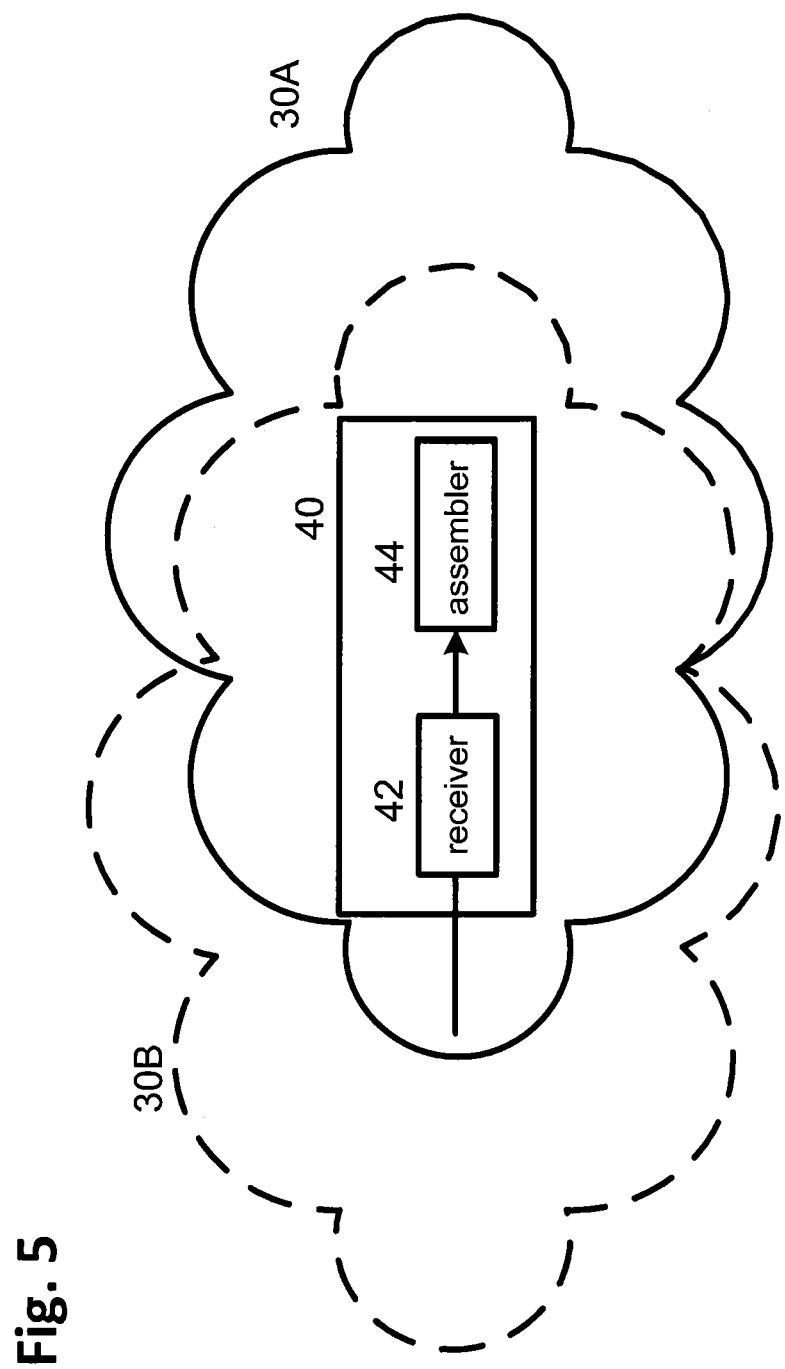
FIG. 5 shows a block diagram illustrating an entity for receiving an access beacon sequence according to a fourth embodiment of the invention.

The fourth embodiment relating to an entity for receiving an access beacon message is now described with reference to FIG. 5. Therein, it is shown an entity (40) for receiving an access beacon sequence. The entity is capable of communicating in a first communication system (30A), and optionally with a second communication system (30B). Optionally, one difference between the two systems can be as follows: entities of the first communication system (30A) are allowed to transmit up to a first maximum power, wherein the first maximum transmission power is larger than a second maximum transmission power allowed in the second communication system (30B). The entity comprises receiving means (or receiver, 42) and assembling means (or assembler, 44). The receiving means (42) is configured to receive a plurality of access beacon portions, wherein each access beacon portion is present on a respective frequency channel amongst a plurality of frequency channels, and wherein different access beacon portions are received on different frequency channels according to portion-frequency association information. Further, each access beacon portion comprises an access beacon segment and an indicator indicating that the access beacon portion refers to an access beacon sequence of the first communication system. It is noted that, being a plurality of portions received, also a plurality of segments is received. The segments are obtained at the transmitting side by segmenting the access beacon sequence, and more in particular by segmenting the access beacon packet comprised in the access beacon sequence. The assembling means (44) is configured to assemble the plurality of access beacon segments received in correspondence of the plurality of access beacon portions so as to obtain the access beacon sequence. For what has been said in relation to the segmentation of the access beacon packet, it follows that also the access beacon packet is obtained as a consequence of the assembling. Consequently, the receiving entity is able to reconstruct the access beacon sequence and the access beacon packet.

The assembling is performed in view of the indicator, indicating that the access beacon portions belong to an access beacon sequence of the communication system in which access beacons are segmented.

Figure 6:
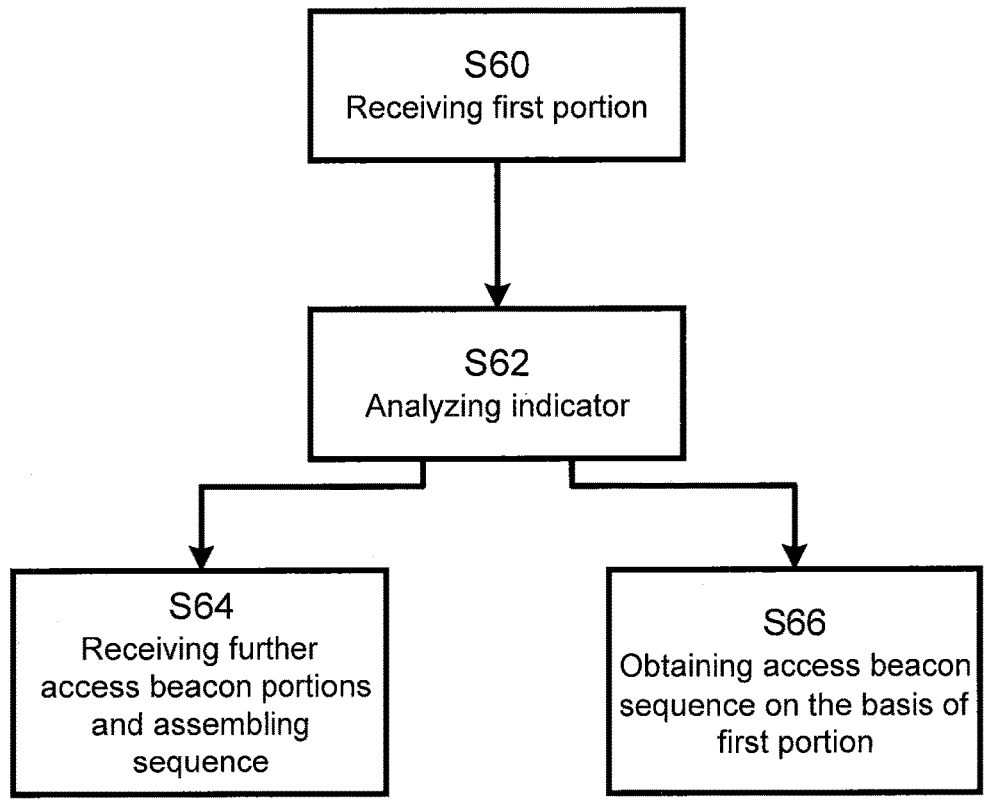
FIG. 6 shows a flowchart illustrating a method for receiving an access beacon sequence according to a fifth embodiment of the invention.

A fifth embodiment will now be described with reference to the flow chart of FIG. 6, illustrating a method for receiving an access beacon sequence at one entity capable of communicating in a first communication system (60A, see also FIG. 7) and in a second communication system (60B). Optionally, one difference between the two systems can comprise the following: entities of the first communication system are allowed for transmit up to a first maximum power, wherein the first maximum transmission power is larger than the second maximum transmission power allowed in the second communication system. In step S60, a first access beacon portion is received on a frequency channel, wherein the first access beacon portion comprises an access beacon segment and an indicator indicating whether the access beacon portion refers to an access beacon sequence of the first communication system or of the second communication system. At step S62, the received indicator is analyzed. In particular, it is determined, on the basis of the received indicator, a system identifier identifying which one amongst the first communication system and the second communication system the access beacon portion refers to. In other words, on the basis of the indicator comprised in at least one access beacon portion received, the entity is capable of establishing whether the access beacon portion refers to the first or the second communication system.

In step S64, when it is established that the system identifier identifies the first communication system (or, in other words, that the access beacon sequence refers to the first communication system), further access beacon portions are received on respective frequency channels according to access beacon portion-frequency association information. In correspondence of the received portions, corresponding access beacon segments are assembled in order to obtain the access beacon sequence comprising the at least one access beacon packet. The assembling of segments corresponds or is reciprocal to the operation of segmenting done at the transmitting side: in this sense, it could also be described as a de-segmentation. The receiving and assembling step are illustrated in the same step 64 in FIG. 6. However, they do not need to be performed necessarily at the same time, but can also be performed one after the other or partially in parallel (e.g. with the use of a buffer, as soon as two or more portions are received, the segments are progressively assembled to obtain the de-segmented packet/sequence).

When it is established that the system identifier identifies the second communication system, step 66 may be performed according to which it is obtained the access beacon sequence comprising the at least one access beacon packet on the basis of the first received portion. In fact, the second communication system is such that the access beacon packet is not segmented. In case the access beacon sequence of the second communication system comprises multiple access beacon packets, each of them can be separately transmitted as a separate unit, but the single packet is not segmented as in the first communication system. An example of such second communication system is the legacy BLE, as also above illustrated.

Figure 7:
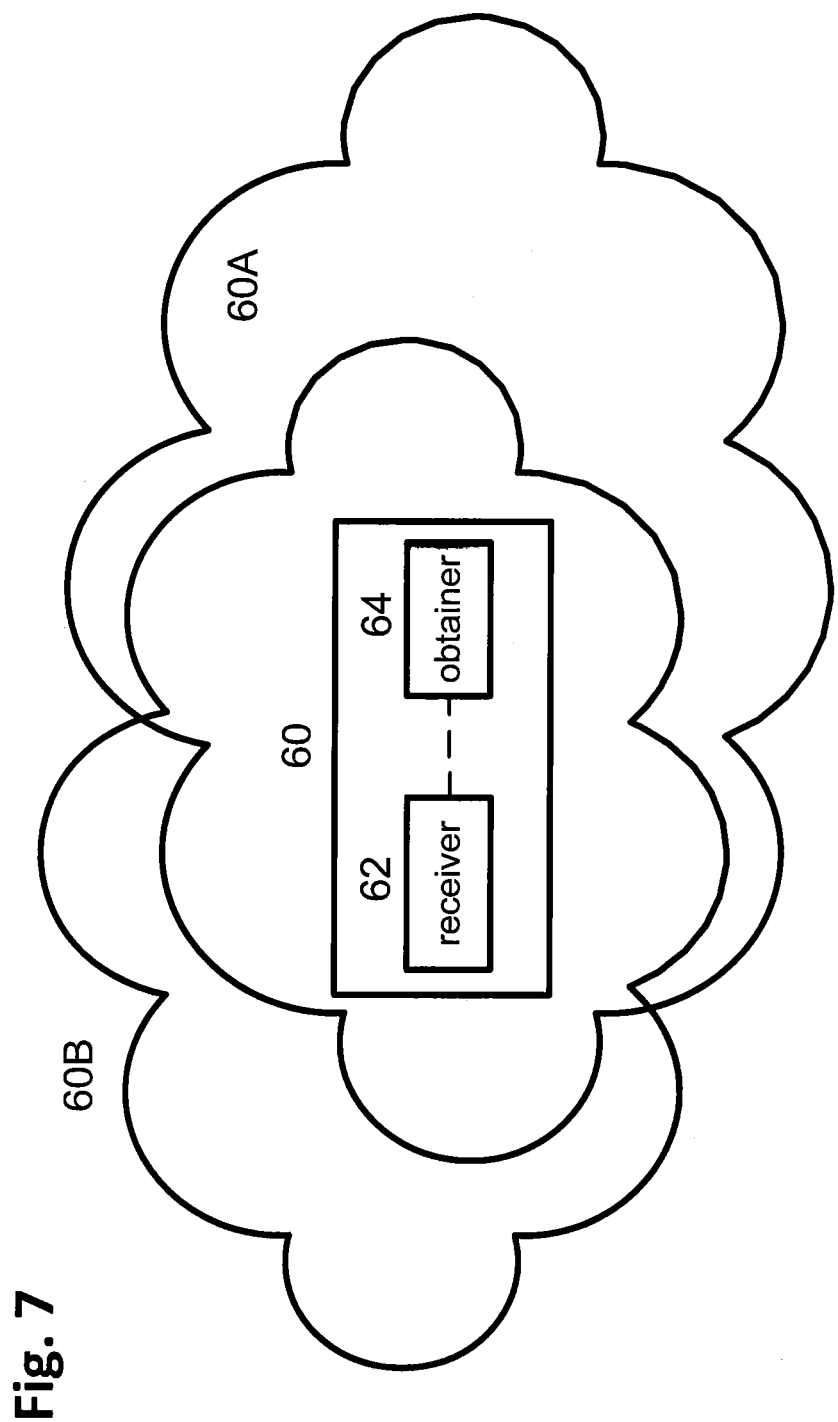
FIG. 7 shows a block diagram illustrating an entity for receiving an access beacon sequence according to a sixth embodiment of the invention.

A sixth embodiment will now be described with reference to the flow chart of FIG. 7, showing an entity 60 capable of receiving an access beacon sequence and capable of communicating in a first communication system (60A) and in a second communication system (60B). For example, the entity of this embodiment is capable of communicating in the high power BLE and the legacy BLE, respectively examples of the first and second communication systems. It is noted that, in one non-limiting example, entities of the first communication system are allowed to transmit up to a first maximum power, the first maximum transmission power being larger than the second maximum transmission power allowed in the second communication system. Further, the access beacon sequence comprises at least one access beacon packet. The entity 60 of the present embodiment comprises receiving means (or receiver, 62) and obtaining means (or obtainer, 64).

The receiving means (62) is adapted to receive a first access beacon portion on a frequency channel, the access beacon portion comprising an access beacon segment and an indicator indicating whether the access beacon portion refers to an access beacon sequence of the first communication system or of the second communication system. In other words, the indicator allows the entity to detect or recognize whether the access beacon sequence (and the at least one packet therein contained) refer to the first or second communication system. Also, the receiving means (62) is configured to receive further access beacon portions on respective frequency channels according to portion-frequency association information, when said indicator indicates that the access beacon portion refers to an access beacon sequence of the first communication system; it is noted that access beacon segments received in correspondence of the received portions are segments of the at least one access beacon packet comprised in the access beacon sequence (see also above, the segmenting implies segmenting the sequence and the packet therein included).

The sequence (packet) access beacon obtaining means (64, also obtaining means in short) is configured to assemble the access beacon segments received in correspondence of the plurality of access beacon portions so as to obtain the access beacon sequence comprising the at least one access beacon packet, when said indicator indicates that the access beacon portion refers to an access beacon sequence of the first communication system. In this case, in fact, the receiving means is configured to receive additional portions. The receiving and obtaining means can operate in parallel, or partially in parallel; alternatively, the obtaining means can operate once the receiving means have completed reception of all or of a number of portions (in fact, corresponding considerations apply also in relation to step 64).

The obtaining means (64) may be further configured to obtain the access beacon sequence comprising the at least one access beacon packet on the basis of the first received portion, when said system identifier identifies the second communication system.

It can be said that the receiving and obtaining means are configured to operate depending on the indicator, i.e. on whether the sequence/packet refers to the first and second system. In the case of the first system, after receiving one portion (not necessarily the temporarily first one sent by the transmitter, if portions are sent in time sequence), then further portions are received in order to obtain the sequence/packet. In case of the second system, the entity can obtain the system and packet also on the basis of only the single received portion (if the packet is sent multiple times in multiple transmission units, the entity can recover each of them, however each of those units is typically not segmented as done in the first system).

Figure 11:
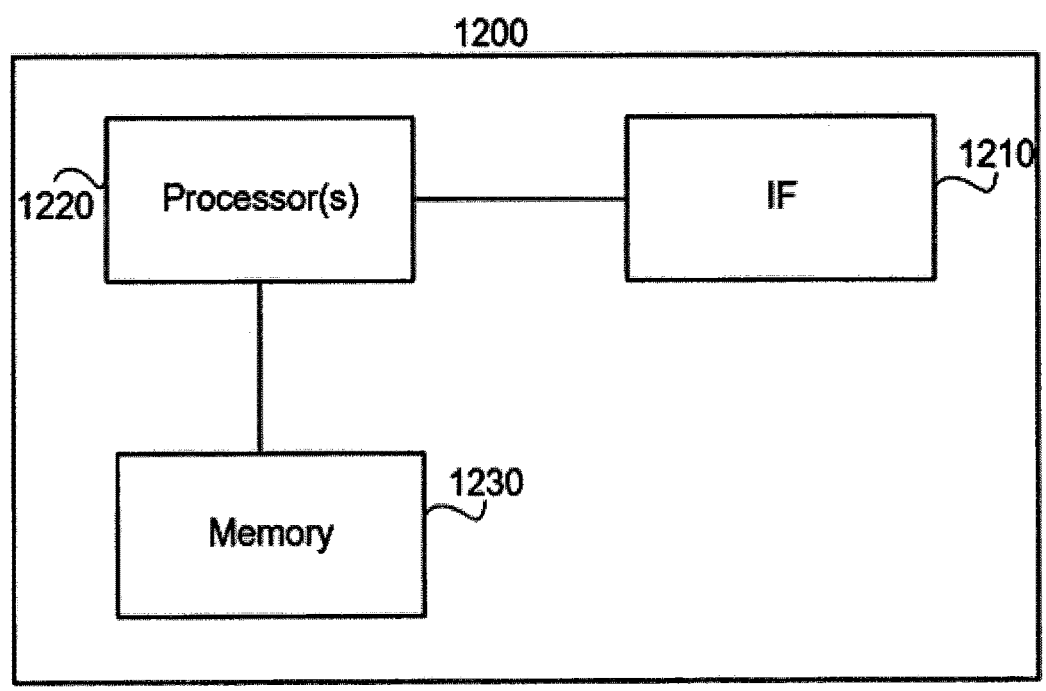
FIG. 11 shows an arrangement like a computer capable of performing any of the method steps described herein.

According to a further embodiment, it is provided a computer program for transmitting an access beacon sequence, wherein the computer program is configured to execute, when the program is executed on a computer, any of or any combination of (including all) the method steps discussed above with reference to FIGS. 2, 4 and/or 6, as well as also all other possible alternatives and optional steps also above discussed. FIG. 11 shows an exemplary computer suitable for executing such a program. More in detail, the illustrated arrangement may include an interface unit 1210 for communicating with one or more other arrangement, for instance over a network, and a processor (or multiple processors) 1220 for executing instructions. Moreover, the arrangement comprises a memory 1230 (or multiple memories, of any suitable kind) for storing the instructions and/or the data related to the instructions. The instructions can be represented by program code module(s). The memory 560 may include a Read Only Memory (ROM), e.g., a flash ROM, a Random Access Memory (RAM), e.g., a Dynamic RAM (DRAM) or Static RAM (SRAM), a mass storage, e.g., a hard disk or solid state disk, or the like. In one example, the processor, the memory and the interface are general hardware components, with instructions causing the arrangement to function according to the above method or according to the above component entity. In another example, the arrangements comprises one or more of customized processor, memory, and interface, which in combination with specific instructions cause the arrangement to function according to the above method or according to the above component entity.

Figure 13:
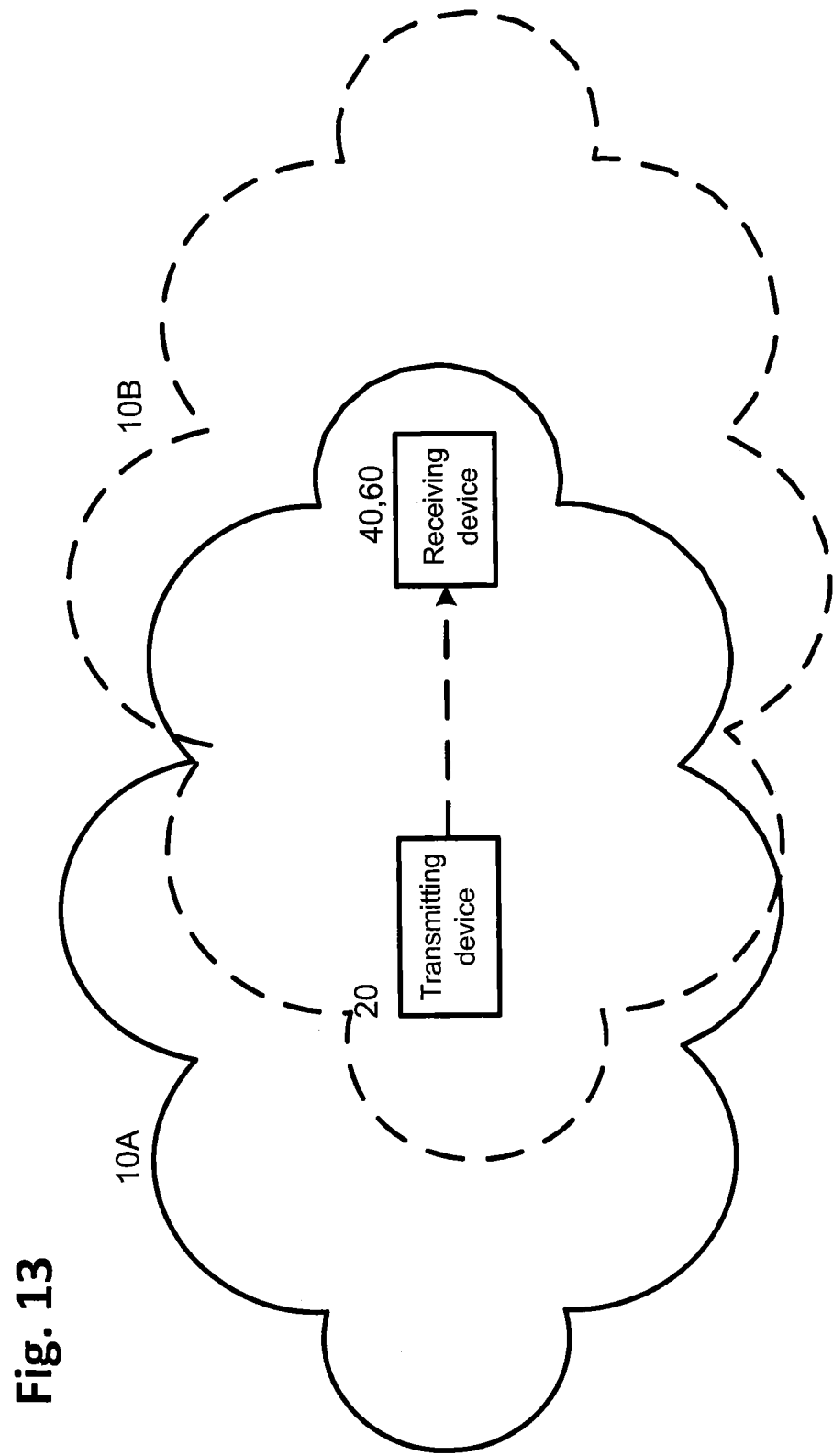
FIG. 13 shows a communication system.

FIG. 13 shows a communication system comprising at least one entity for transmitting (20) and access beacon message, and at least one entity (40, 60) for receiving the access beacon message. The transmitting and receiving entities can be any of the above described respective entities, to which reference is made. The communication system may be such that it comprises a communication system (10A) allowing communication to be performed only according to the access beacon scheme herein described; however, the system could also include a communication system (10B) allowing legacy access beacon. In the latter case, at least one of the entities therein comprised would be able to transmit and/or receive according to the legacy access beacon scheme and the access beacon scheme herein described.

In the following, additional embodiments and examples are given to further facilitate the understanding of the invention.

According to an illustrative example falling within the above embodiments, an alternative design of the BLE access beacon scheme is presented. The proposed scheme makes use of a non-adaptive frequency hopping (FH) scheme, made up by at least three sub-sequences, where each FH sub-sequence may carry the same (link layer) payload (compare with existing BLE access beacons for which the payload is repeated over all used access beacon channels; the payload is an example of the access beacon packet). The physical channels used may be the same as used by the existing BLE technology, or the first access beacon portion is sent on one of the channels used currently by BLE (the other portions can be sent on any other channel). The payload is one example of the access beacon packet above discussed, and the three sub-sequences are an example of sub-sequences comprised in the above discussed access beacon sequence.

In this example, the different FH sub-sequences make use of different or unique channels and are of equal length (M), e.g., of the length of six (6) segments (which can be also the number 6 of channels, in case each segment is sent on a different segment). Each sub-sequence may start off using one of the physical channels reserved for today's access beacon scheme and includes (at least) information indicating that this transmission is the start of a first system access beacon message. Furthermore, a transmitter which is about to transmit an access beacon link layer (LL) packet segments the (channel encoded and interleaved, if applicable) packet into M segments; one segment per physical channel in the FH sub-sequence (segmenting the LL packet is in fact an example of segmenting the packet comprised in the sequence, the number of bits per segment may vary). In addition, an access address characterizing (optionally unique to) the high power access beacon transmission is added to each data segment as a prefix, replacing the access address used today on the access beacon channels. The access address is an example of the indicator above discussed. Moreover, a legacy BLE preamble may optionally be appended to each data segment; the different segments are then transmitted over the respective channels in the FH sub-sequence.

A receiver that scans for access beacon transmissions, may scan on the same channels as used for the legacy BLE access beacon transmissions. The detection of a preamble indicates that there is a transmission on the channel. The access address, which may come next, indicates if it is a legacy access beacon transmission or a high power access beacon transmission. For legacy BLE access beacon the device can process the packet just as access beacon packets are processed today (e.g. they do not need to perform the above de-segmentation, i.e. reassembling, to obtain one LL packet). For high power access beacon, the receiver may next decodes the optional control field to get information about the FH sub-sequence (if present, see above: if FH sequence known a priori, there is no need to transmit such information) and then collects and reassembles the entire access beacon packet from the data segments transmitted over the different channels in the FH sub-sequence. Legacy scanners will detect the preamble of the high-power BLE access beacon; however, as a legacy device does not recognize the high-power access address the legacy scanner will disregard such a packet. As one option a high power BLE specific preamble may be used which would allow a high power BLE receiver to detect that the access beacon portion belongs to a high power BLE access beacon packet. A legacy BLE receiver would ignore the high power BLE preamble and the following of the access beacon portion, since the preamble is different from the legacy BLE preamble.

Figure 8:
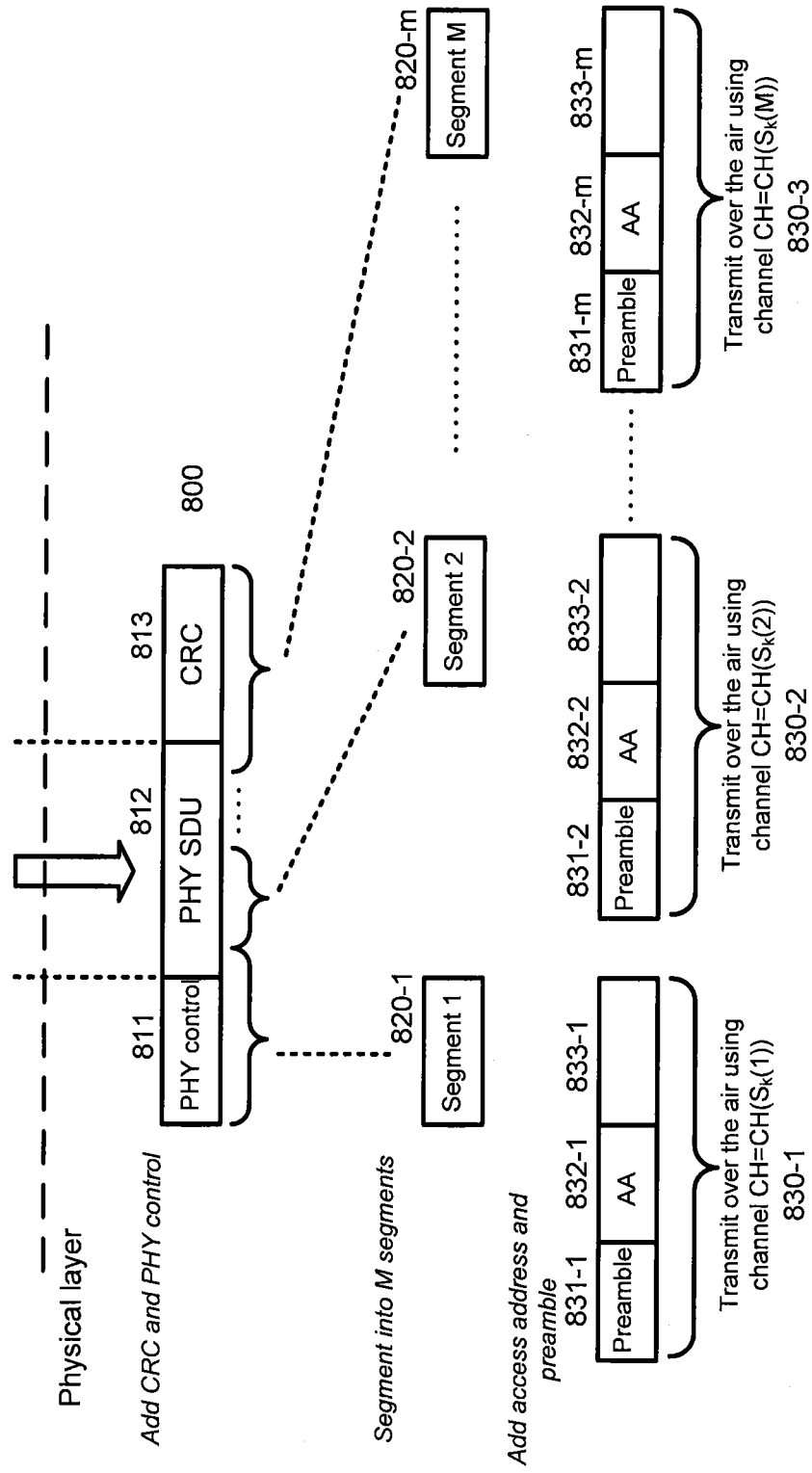
FIG. 8 shows a schematic diagram illustrating physical layer packet processing at the transmitter side for a high power BLE according to an embodiment of the invention.

FIG. 8 provides an exemplary overview of the proposed PHY layer packet processing for high power access beacon. First, the LL PDU is delivered down to the physical layer and a CRC 813 may be added to the packet. Just as for legacy BLE the CRC may be calculated over the PHY SDU 812 (LL PDU). The PHY SDU can be regarded an example of the access beacon packet, though for the purpose of the invention also the LL PDU can be regarded as an example of the access beacon packet, since both comprise the information necessary to the effect of access beacon. Optionally, a physical layer control field (PHY control, 811) is appended as well. If present, the PHY 811 control field identifies the FH sub-sequence.

Next, the packet is segmented into M segments (820-1, 820-2, . . . 820-$m$), preferably but not necessarily of equal size. To each of these segments an access address (832-1, 832-2 . . . 832-$m$) is added together with an optional preamble (831-1, 931-2 . . . 831-$m$). As the purpose of the preamble is for the receiver of the packet to discover the BLE transmission, the preamble may be the same as used for legacy BLE transmissions. In case the preamble is omitted, the receiver may detect the transmission by other means, e.g. by specifically handling the segmented payload part (e.g. applying specific codes, modulation, . . . ). For high-power BLE it is proposed to use an access address 832 that is different from the legacy BLE access beacon access address, and preferably selected in such a way that the cross-correlation between the legacy and the high power access address is low. Each of the segments (830-1, 830-2 . . . 830-$m$) is finally transmitted over one of the BLE physical channels. The channel used for each specific segment depends on the FH sub-sequence number (k) and the segment number m:

$$CH=CH(Sk(m))$$

The purpose of the optional PHY control field 811 is to indicate to the receiver which frequency hopping sequence is being used. From reading the content of the PHY control field the receiver hence knows the frequency hopping pattern employed by the transmitter and can follow it. If pre-defined hopping sequences are used, however, the PHY control field is not needed and can be abandoned. Several different solutions are possible, including:

- The FH sub-sequence is pre-defined, meaning that when the receiver detects the first segment or portion, it knows on which channels the sub-sequent segments can be found. In this case no PHY control field is needed.
- A set of FH sub-sequences are pre-defined and the transmitter determines which sub-sequence to use for the present transmission. The information in the PHY control field contains which sub-sequence that is used making it possible for the receiver to tune the receiver to the correct channel for each segment. One possible solution is to let a bitmap indicate which FH sub-sequence that is used and include the bitmap in the PHY control field.
- The channels for each FH sub-sequence are determined fully dynamically by the transmitter and the information in the PHY control field explicitly indicates the channels in the currently used sub-sequence. In this example, the FH sub-sequences are constructed such that the first channel of all sequences is one of the existing access beacon channels and combined the sub-sequences makes use of at least 15 unique channels. This is however merely an example, as in fact other values can be foreseen like for example 5.

Moreover, depending on the size of the link layer payload and the number of segments (M) used in the FH sub-sequence it may be that padding must be added before packet segmentation. Padding is however well-known and is not discussed further here.

Figure 9A:
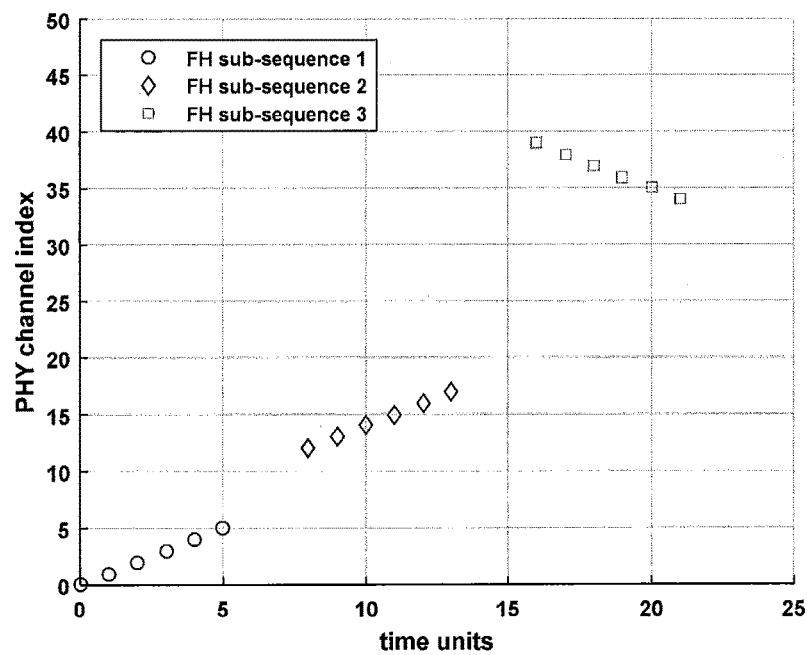
FIGS. 9A and 9B show examples of frequency hopping sub-sequences; in particular, the plot of FIG. 9A illustrates three sub-sequences each using adjacent physical channels, while the plot of FIG. 9B illustrates three sub-sequences using distributed physical channels.
Figure 9B:
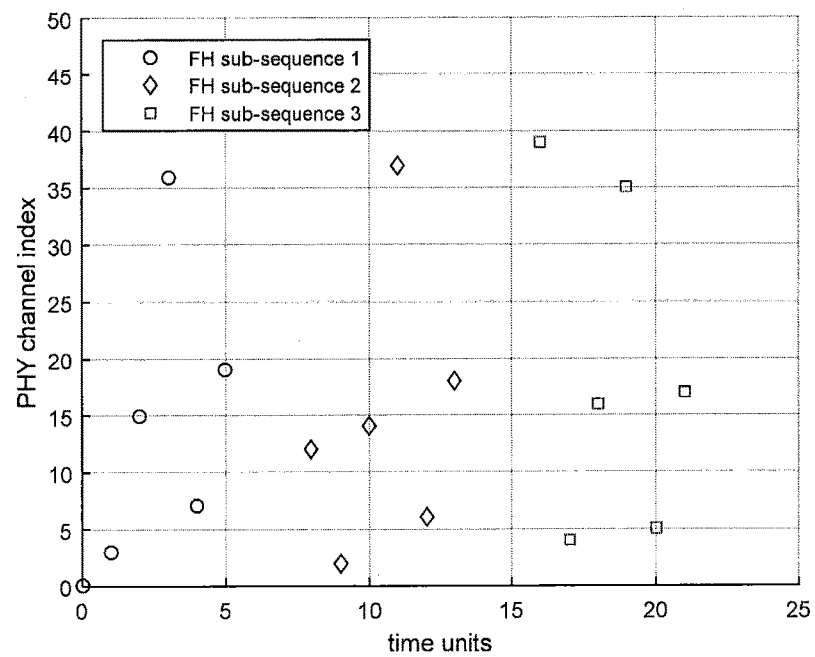

An example is now given of frequency hopping sequences with reference to FIGS. 9A and 9B. The FH scheme is made up of several sub-sequences Sk, k=1, 2, . . . , K, and each sub-sequence comprises M segments (m=1, 2, . . . , M). Each sub-sequence comprises one access beacon packet. Example values may be K=3 and M=6. We here refer to segment m of sub-sequence k as Sk(m). The same information (LL PDU, i.e. an access beacon packet) may be repeated over all the K sub-sequences, and, within a FH sub-sequence, a channel is selected based on the sub-sequence Sk and the segment m within the sub-sequence:

$$CH=CH(Sk(m))$$

The channel selection is configured such that the first segment or portion of all sub-sequences belongs to the legacy set of access beacon channels used, i.e.:

$$CH(Sk(1)) \in A, \forall k$$

where A is the set of access beacon channels.

Figure 12:
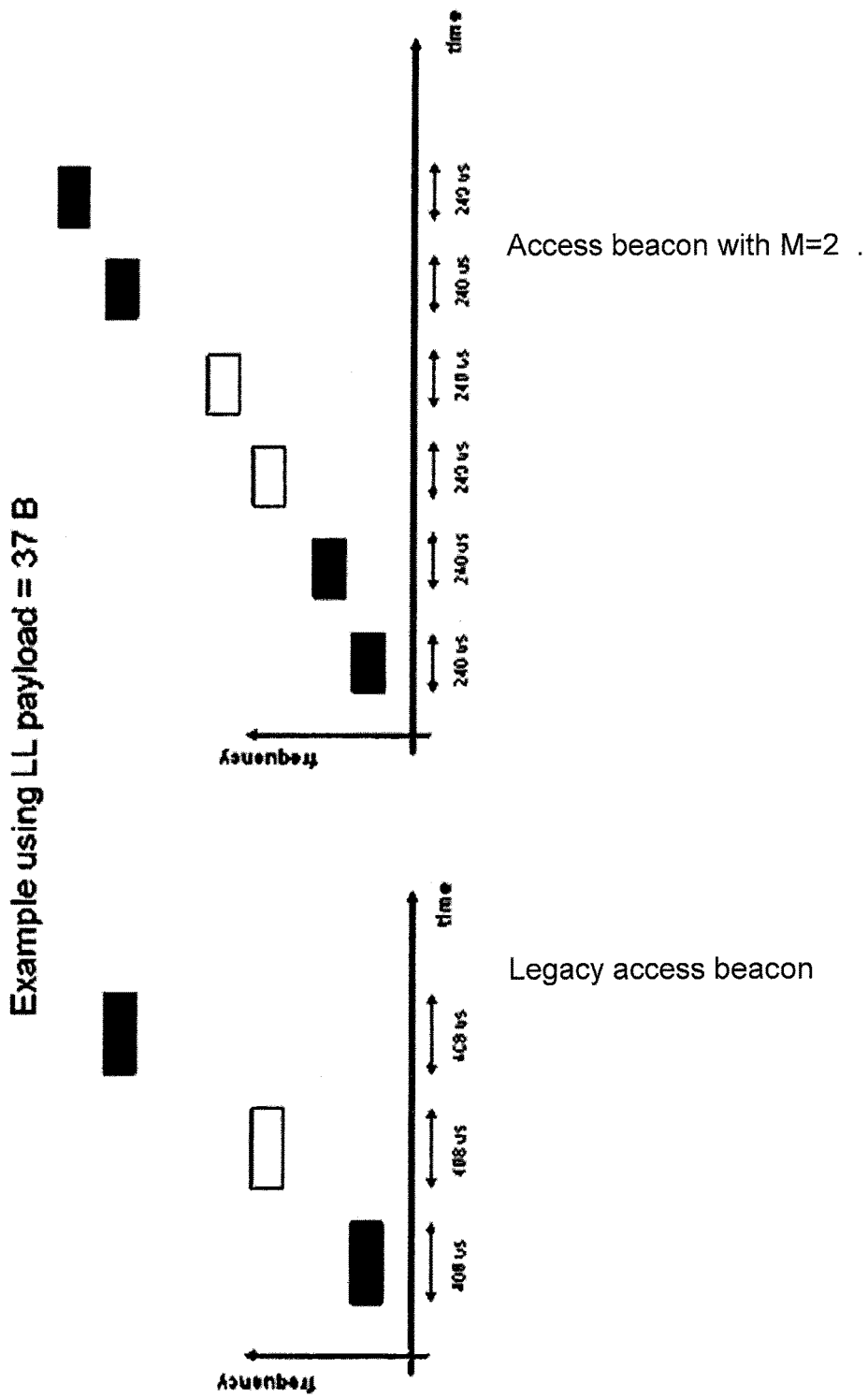
FIG. 12 shows an example using payload of 37 Bytes.

The remaining segments of each respective sub-sequence may be selected in different ways. One option is to construct a sub-sequence from adjacent physical channels, as illustrated for instance in FIG. 9A. Another option is to make use of distributed physical channels, as illustrated for instance in FIG. 9B. Yet different designs of the hopping sequence can be envisioned, however, for the sake of simplicity only the two examples below are provided here. Furthermore, FIG. 12 shows an example using payload of 37 Bytes. In particular, the graph on the left side refers to legacy access beacon, while the graph on right side to "High power" access beacon transmission with M=2.

Figure 10:
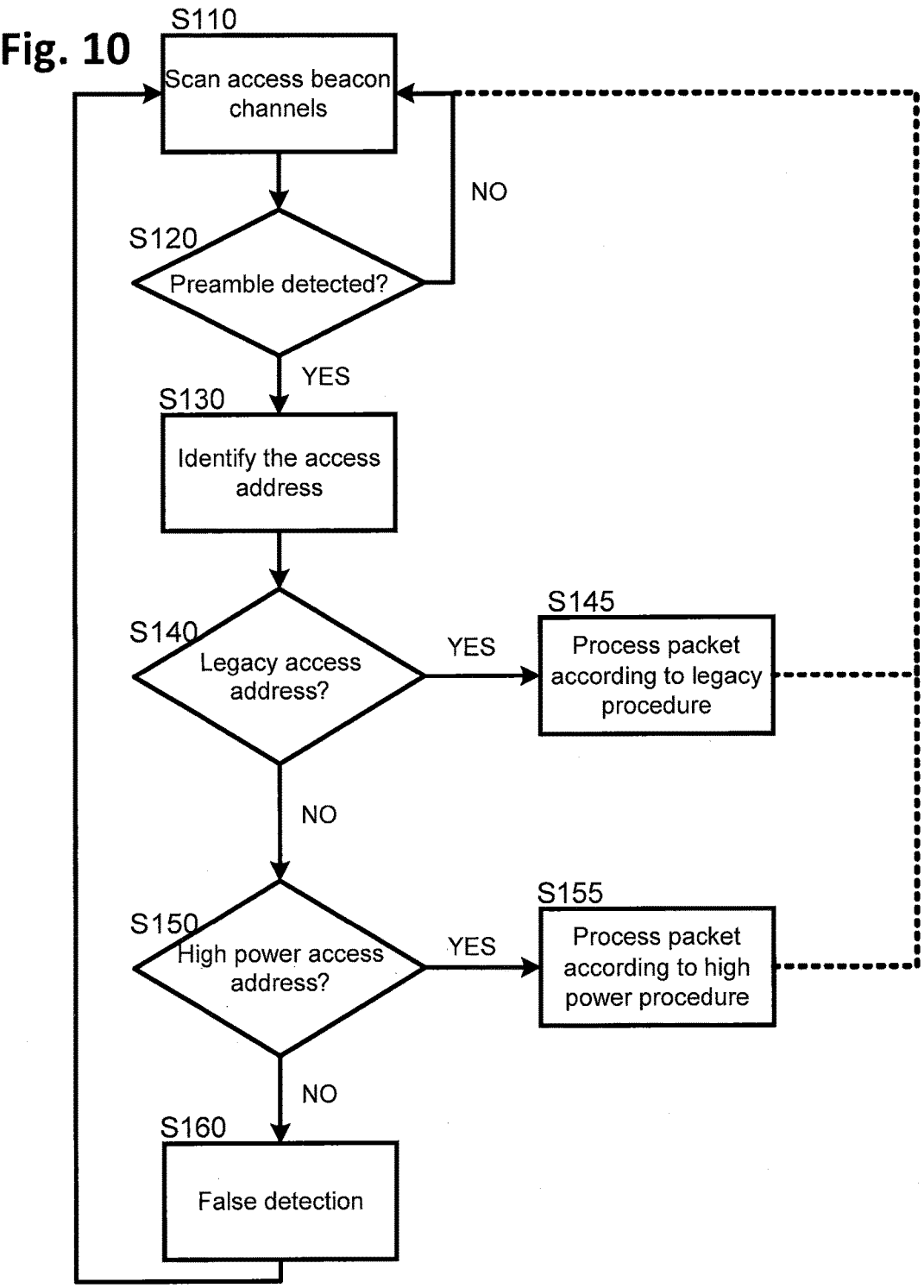
FIG. 10 is a flow chart illustrating a scanning procedure according to an embodiment of the invention.

Further, an example of a scanning procedure is provided with reference to FIG. 10, wherein a scanning BLE device would use the radio to scan simultaneously for both legacy BLE access beacons as well as high power BLE access beacons. The flow diagram in FIG. 10 provides a description of how the scanner may operate. The scanner continuously searches (S110) for activity on the BLE access beacons channels. If a preamble is detected (s120, yes branch) the scanner continues and analyzes the access address in the next step (S130). If it is a legacy access address (s140, yes branch), the device will process (S145) the received access beacon according to the legacy BLE procedure. If it is a high power access address (s150, yes branch) the device will process it (S155) following a procedure for high power access beacon packets, which, in short, can be explained for illustrative purposes according to this example as follows:

After detecting the preamble and the access address, the device may analyze the PHY control field which may be part of the first data segment. From this field the device may identify the FH sub-sequence, from which the scanner may know on which channels the coming segments can be found. The device will also buffer any payload that is part of the first data segment.

The device then continues to receive the following M−1 data segments, which are transmitted over the channel as defined by the FH sub-sequence.

When all the segments have been received, and after removing all preambles and access addresses, the device reassembles the (estimated) PHY SDU by concatenating all the data segments.

After this step the process continues as for legacy BLE access beacon, e.g., the CRC is checked and the data is delivered to higher layers.

If a high power access beacon transmission is picked up by a legacy BLE scanner, i.e., a scanner that may receive legacy BLE access beacons but not high power BLE access beacons, the scanner will detect the preamble but not recognize the access address. When the scanner is not able to identify the access beacon access address, it concludes that this was not a valid packet and aborts further packet processing. In short, it can be further said that, once an access beacon packet of "high power" type detected:

- Stay on channel to capture first segment;
- Hop to next channel to receive second segment, and so on;
- Once all M segments are received, the packet can be re-assembled, CRC checked, and forwarded to higher layers The invention proposes thus a novel access beacon scheme, applicable for instance to existing BLE (in the sense of an extension or modification), which can be said to be a non-adaptive FHSS system. One of the advantages achieved lies in that it is possible to minimize impairment on other devices, e.g. minimizing or at least reduce interferences and collisions. This can be illustrated on the basis of the following recognitions by the inventors: Adverting transmissions in BLE are today making use of only three out of the forty (40) available BLE channels and a copy of the access beacon message is transmitted in full on each of the three channels. With large access beacon message payload and low transmission data rates such a transmission can have a long duration, making it relatively likely that it collides with other BLE access beacon transmissions originating from other devices located in the same area. This is a problem that also becomes more severe with the number of active BLE devices. Moreover, even though the three channels are well separated, such transmissions are associated with limited frequency and interference diversity. From a wireless coexistence perspective, considering also that the frequency band can be used by other wireless systems and technologies, it is further problematic that the generated interference is limited to only three BLE channels. Further, there is a wish to increase the range of BLE devices, which can be achieved in different ways like increasing sensitivity or increasing power. However, when increasing power, the problems relating to interferences to other devices increase even further.

In a use case of the proposed access beacon scheme (see e.g. the above example), by transmitting the access beacon message over a larger number of BLE channels, the risk is reduced that the BLE access beacon transmission collides with BLE transmissions from other devices. A reduced collision risk reduces latency, especially in situations where the number of active BLE devices is large. Furthermore, the proposed solution provides enhanced frequency and interference diversity, which improves the packet reception probability. Yet further, the interference caused by the proposed access beacon scheme improves the coexistence properties and will simplify coexistence with other wireless technologies operating in the same band. The proposed scheme is backwards compatible in the sense that it is possible for a BLE scanner to scan simultaneously for transmissions using the proposed access beacon scheme as well as for access beacon transmissions using the legacy BLE access beacon scheme. The scheme is further transparent to legacy devices, as legacy devices will not recognize a transmission associated with the new access beacon scheme and simply disregard such transmissions.

Importantly, amongst other advantages, the invention also allows increasing the maximum allowed power while maintaining interferences and impairment to other devices to a level lower than when increasing the power in the legacy BLE without modifying the existing access beacon scheme. The above aspects, embodiments, examples and figures have been discussed in relation to access beacon messages or access beacon sequences. While the above achieves particular advantages when dealing with access beacons, the same considerations apply to control sequences comprising control messages segmented accordingly.

The entity(ies) above discussed may be implemented in hardware, software or any suitable combinations thereof. Moreover, the entity(ies) may be implemented as a network node or as a device, or within a network node or within a device. Examples of such devices falling under an entity are: sensors, controllers, actuators, cellular phones, tables, smartphones, computers, any type of appliances (industrial as well as domestic), etc. In other examples, the entity(ies) may be distributed over several network nodes or devices or may be comprised within a network node or device.

Where the terms like segmenting means, generating means, transmitting means, receiving means, assembling means, obtaining means are used herein, no restriction is made regarding how distributed these units may be and regarding how gathered elements may be. Also, the referred term may be substituted by segmenting unit, generating unit, transmitting unit, receiving unit, assembling unit, obtaining unit, respectively. That is, the constituent units, parts of a unit or element or entity may be distributed in different software or hardware components or devices for bringing about the intended function. A plurality of distinct elements may also be gathered for providing the intended functionalities. Any one of the above-referred units of an entity, or an element, or a network device, or a network node, etc. . . . may be implemented in hardware, software, field-programmable gate array (FPGA), application-specific integrated circuit (ASICs), firmware or the like.

It will be apparent to those skilled in the art that various modifications and variations can be made in the entities, methods, systems, computer programs and signals (carrying instructions for executing the program) of the invention as well as in the construction of this invention without departing from the scope or spirit of the invention. The invention has been described in relation to particular embodiments and examples which are intended in all aspects to be illustrative rather than restrictive. Those skilled in the art will appreciate that many different combinations of hardware, software and firmware will be suitable for practicing the present invention, which scope and spirit is defined by the following claims.

The invention claimed is:

1. A method for transmitting an access beacon sequence by one entity capable of communicating in a communication system, said access beacon sequence comprising at least one access beacon packet, the method comprising:
  segmenting the access beacon sequence in a plurality of access beacon segments, wherein segmenting the access beacon sequence comprises segmenting said at least one access beacon packet;
  for each one of said plurality of access beacon segments, generating an access beacon portion comprising a corresponding one of said plurality of access beacon segments and an indicator indicating that the access beacon portion refers to an access beacon sequence of the communication system, so as to obtain a plurality of access beacon portions corresponding to the plurality of access beacon segments; and
  transmitting each access beacon portion of the plurality of access beacon portions on a respective frequency channel amongst a plurality of frequency channels, wherein different access beacon portions are sent on different frequency channels according to portion-frequency association information;
  wherein the indicator is a first indicator sequence having low cross-correlation with a second indicator sequence used to indicate access beacon portions referring to access beacon sequences of a further transmission system different from said communication system.

2. The method according to claim 1, wherein the frequency channels used for the access beacon portions are at least partly in common with frequency channels used for bi-directional communication.

3. The method according to claim 1, wherein a first portion of the access beacon sequence is sent on a frequency channel belonging to a set of frequency channels used only for access beacon.

4. A computer program product comprising a non-transitory computer readable storage medium storing program code for transmitting an access beacon sequence, the program code when executed by a processor causes the processor to perform the method of claim 1.

5. An entity for transmitting an access beacon sequence, the entity capable of communicating in a communication system, said access beacon sequence comprising at least one access beacon packet, the entity comprising:
  a processor; and
  a memory coupled to the processor and storing program code that when executed by the processor causes the processor to perform operations comprising:
  segmenting the access beacon sequence in a plurality of access beacon segments, wherein segmenting the access beacon sequence comprises segmenting said at least one access beacon packet;
  generating, for each one of said plurality of access beacon segments, an access beacon portion comprising a corresponding one of said plurality of access beacon segments and an indicator indicating that the access beacon portion refers to an access beacon sequence of the communication system, so as to obtain a plurality of access beacon portions corresponding to the plurality of access beacon segments; and transmitting each access beacon portion of the plurality of access beacon portions on a respective frequency channel amongst a plurality of frequency channels, wherein different access beacon portions are sent on different frequency channels according to portion-frequency association information;

wherein the indicator is a first indicator sequence having low cross-correlation with a second indicator sequence used to indicate access beacon portions referring to access beacon sequences of a further transmission system different from said communication system.

6. The entity according to claim 5, wherein the communication system is a first communication system, and wherein the entity is configured for transmitting up to a first maximum power allowed in the first communication system, the first maximum transmission power being larger than a second maximum transmission power allowed in a second communication system.

7. The entity according to claim 5, wherein the access beacon sequence comprises a plurality of access beacon packets, the plurality of access beacon packets comprising copies of a single access beacon packet.

8. The entity according to claim 5, wherein the frequency channels used for the access beacon portions are at least partly in common with frequency channels used for bi-directional communication.

9. The entity according to claim 5, wherein the operations for transmitting transmit a first portion of the access beacon sequence on a frequency channel belonging to a set of frequency channels used only for access beacon.

10. The entity according to claim 5, wherein the access beacon packet comprises a field for identifying the portion-frequency association information.

11. A method for receiving an access beacon sequence at one entity capable of communicating in a communication system, said access beacon sequence comprising at least one access beacon packet, the method comprising:

receiving a plurality of access beacon portions related to the communication system, each access beacon portion of the plurality of access beacon portions being present on a respective frequency channel amongst a plurality of frequency channels, wherein different access beacon portions are received on different frequency channels according to portion-frequency association information, and wherein each access beacon portion comprises an access beacon segment and an indicator indicating that the access beacon portion refers to an access beacon sequence of the communication system, further wherein segments received in correspondence of the plurality of received portions comprise segments of said at least one access beacon packet comprised in the access beacon sequence; and assembling the plurality of access beacon segments received in correspondence of the plurality of access beacon portions so as to obtain the access beacon sequence comprising the at least one access beacon packet;

wherein the indicator is a first indicator sequence having low cross-correlation with a second indicator sequence used to indicate access beacon portions referring to access beacon sequences of a further transmission system different from said communication system.

12. The method according to claim 11, wherein the frequency channels used for the access beacon portions are at least partly in common with frequency channels used for bi-directional communication.

13. The method according to claim 11, further comprising receiving a first portion of the access beacon sequence on a frequency channel belonging to a set of frequency channels used only for access beacon.

14. An entity for receiving an access beacon sequence, the entity capable of communicating in a communication system, said access beacon sequence comprising at least one access beacon packet, the entity comprising:

a processor; and a memory coupled to the processor and storing program code that when executed by the processor causes the processor to perform operations comprising:

receiving a plurality of access beacon portions, each access beacon portion of the plurality of access beacon portions being present on a respective frequency channel amongst a plurality of frequency channels, wherein different access beacon portions are received on different frequency channels according to portion-frequency association information, and wherein each access beacon portion comprises an access beacon segment and an indicator indicating that the access beacon portion refers to an access beacon sequence of the communication system, further wherein segments received in correspondence of the plurality of received portions are segments of said at least one access beacon packet comprised in the access beacon sequence; and assembling the plurality of access beacon segments received in correspondence of the plurality of access beacon portions so as to obtain the access beacon sequence comprising the at least one access beacon packet;

wherein the indicator is a first indicator sequence having low cross-correlation with a second indicator sequence used to indicate access beacon portions referring to access beacon sequences of a further transmission system different from said communication system.

15. The entity according to claim 14, wherein the communication system is a first communication system, and wherein the entity is configured for transmitting up to a first maximum power allowed in the first communication system, the first maximum transmission power being larger than a second maximum transmission power allowed in a second communication system.

16. The entity according to claim 14, wherein the access beacon sequence comprises a plurality of access beacon packets, the plurality of access beacon packets comprising copies of a single access beacon packet.

17. The entity according to claim 14, wherein the frequency channels used for the access beacon portions are at least partly in common with frequency channels used for bi-directional communication.

18. The entity according to claim 14, wherein the operations for receiving receive a first portion of the access beacon sequence on a frequency channel belonging to a set of frequency channels used only for access beacon.

19. The entity according to claim 14, wherein the access beacon packet comprises a field for identifying the portion-frequency association information.

20. A computer program product comprising a non-transitory computer readable storage medium storing program code for receiving an access beacon sequence, the program code when executed by a processor causes the processor to perform the method of claim 11.

21. The method according to claim 1, wherein said first indicator sequence indicates that said access beacon portions are for one of a first type of Bluetooth Low Energy (BLE) communication system and a second type of BLE communication system, and said second indicator sequence indicates that said access beacon portions are for the other one of said first type of BLE communication system and said second type of BLE communication system.

22. The method according to claim 21, wherein said first type of BLE communication system is configured to use more than three BLE channels and said second type of BLE communication system is configured to use three or fewer BLE channels.

23. The method according to claim 5, wherein said first indicator sequence indicates that said access beacon portions are for one of a first type of Bluetooth Low Energy (BLE) communication system and a second type of BLE communication system, and said second indicator sequence indicates that said access beacon portions are for the other one of said first type of BLE communication system and said second type of BLE communication system.

24. The method according to claim 11, wherein said first indicator sequence indicates that said access beacon portions are for one of a first type of Bluetooth Low Energy (BLE) communication system and a second type of BLE communication system, and said second indicator sequence indicates that said access beacon portions are for the other one of said first type of BLE communication system and said second type of BLE communication system.

25. The method according to claim 14, wherein said first indicator sequence indicates that said access beacon portions are for one of a first type of Bluetooth Low Energy (BLE) communication system and a second type of BLE communication system, and said second indicator sequence indicates that said access beacon portions are for the other one of said first type of BLE communication system and said second type of BLE communication system.

* * * * *